United States Patent [19]

Lightner

[11] E Re. 31,520

[45] Reissued Feb. 14, 1984

[54] COMBINATION LAWN MOWER TOOL

[76] Inventor: Theodore P. Lightner, Box 712, Smithville, Tex. 78957

[21] Appl. No.: 435,562

[22] Filed: Oct. 21, 1982

Related U.S. Patent Documents

Reissue of:

[64] Patent No.: 4,315,339
Issued: Feb. 16, 1982
Appl. No.: 82,046
Filed: Jan. 14, 1980

[51] Int. Cl.[3] ..... B25F 3/00; B23P 19/04; B25B 13/48

[52] U.S. Cl. ..... 7/138; 81/90 R; 81/177 A; 29/217; 29/264; 29/267

[58] Field of Search ..... 7/138, 166, 170; 81/90 R, 90 C, 90 F, 177 A; 29/215, 216, 214, 217, 218, 264, 256, 267

[56] References Cited

U.S. PATENT DOCUMENTS

| | | | |
|---|---|---|---|
| 1,196,703 | 8/1916 | Kraut . | |
| 1,358,530 | 11/1920 | Dean | 29/214 |
| 1,360,891 | 11/1920 | Court . | |
| 1,600,641 | 9/1926 | Marston et al. . | |
| 1,900,314 | 3/1933 | Strom . | |
| 2,205,979 | 6/1940 | Horechney . | |
| 2,965,958 | 12/1960 | Gribble . | |
| 3,010,192 | 11/1961 | Rufer et al. . | |
| 3,021,651 | 2/1962 | Fuller et al. | 51/241 VS |
| 3,089,286 | 5/1963 | Ulrich . | |
| 3,599,311 | 8/1971 | Ellis . | |
| 4,103,378 | 8/1978 | Grandos . | |
| 4,104,935 | 8/1978 | Stoops | 81/177 A |

*Primary Examiner*—Roscoe V. Parker
*Attorney, Agent, or Firm*—Roylance, Abrams, Berdo & Goodman

[57] ABSTRACT

A tool for use as a special wrench, flywheel puller, valve remover, and valve and valve seat grinder. The tool includes two rectangular bars of steel which may be bolted in one of two positions to either provide an extension handle when the tool is used as a special wrench or to provide a double thickness of steel when the tool is used as a flywheel puller. One of the bars carries a pair of angle iron sections which define therewith a C-shaped clamp, and a threaded bolt protrudes through one of the angle sections for compressing a valve spring when using the tool for removing a valve. The threaded bolt also includes a handle for turning the same which carries a rubber disc which may be removed and chucked in a speed drill to grind a valve or valve seat.

8 Claims, 7 Drawing Figures

11
89
17
15
40
45
8
16
72
74
71
75
76
41
73
25
35
70
77
26
27
28
29
30

COMBINATION LAWN MOWER TOOL

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a tool made of metal for the purpose of making repairs on small internal combustion engines, mostly lawnmower engines. The present invention provides a special wrench for removing and replacing the starter clutch housing on most Briggs and Stratton engines, a flywheel puller for most Briggs and Stratton engines, a valve remover for all makes of small engines, a valve and valve seat grinding tool for all makes of small engines.

2. Description of the Prior Art

The four tools can be bought separately but they are difficult to locate except in the larger cities. This makes it difficult and expensive for all the "do-it-yourself" mechanic. The four special tools separately cost about $35.00. My combination tool should sell for about $12.00 including a booklet on engine repairs.

The four special tools separately are well known to the prior art, but it is more difficult to store and locate four separate tools.

Ignition failure is often caused by faulty breaker points and condenser that often need only cleaning and filing; however, a special wrench and flywheel puller are necessary. Removing the carbon and grinding the valves and valve seat require a valve remover and a small tool for grinding the valves. These jobs can be accomplished with only one tool, the combination tool, without sacrificing efficiency or quality of work performed.

SUMMARY OF THE PRESENT INVENTION

My invention is a rugged and low cost four purpose tool. The present invention replaces four special tools that are designed to take apart for repairs small internal combustion engines, mostly lawnmower engines.

The combination tool in use provides a special wrench and flywheel puller that fits most Briggs & Stratton engines. The present invention also provides a valve remover and a small tool for grinding the valves by employing an electric drill. The valve remover and valve grinding tool can be used on all makes of small engines.

To construct said wrench, two flat rectangular bars of steel stock are bolted end to end to form the wrench handle. On one end of said bar, a protruding secured bolt acts as a post. Two inches away from said post, a section of angle iron is welded across said bar, forming a right angle on each side of said bar. This combination of post and right angles laid flat on the top of the starter clutch housing forms a non-slip leverage hold on said housing for unthreading or tightening said housing. To block the flywheel from turning a ⅝" nut refered to later is used. Said nut is placed in a recess in the flywheel and against the engine block.

For flywheel pulling the two said rectangular bars are placed face to face to form a double thickness of steel. About midway from each end of said bars, three properly spaced holes are drilled through said bars. Each outside hole provides a self-threading bolt with a nut on each side of said bar. One said bolt temporarily provides a ⅝" nut. Said ⅝" nut is lightly threaded on top of the crackshaft. Then the center hole is placed on top of said nut and said nut acts as a base for the flywheel puller. In this position, the two self-threading bolts line up with holes in the flywheel and said bolts are screwed into the flywheel holes, then tighten the two top nuts clockwise against said bar until the flywheel moves up.

For compressing the valve spring to remove the valve, a short section of angle iron is welded to the opposite end of said bar forming a right angle and extending out to one side of said bar, thus forming a figure "C" or a three sided clamp. A thin section of channel iron with a cut out jaw on one end is bolted to the top side of said angle iron. The top angle iron mentioned earlier welded across the top of the rectangular bar provides a nut welded to one end of said angle iron and said nut provides a threaded bolt for the purpose of applying pressure to the top of the valve for torque to compress the valve spring. Thus, shove said jaw under the valve spring, then turn said torque bolt clockwise, thus compressing the spring for removal of the valve retainer and valve.

The valve grinding tool consists of a small threaded bolt providing a firm round rubber disc on one end of said bolt. Said bolt in use temporarily acts as a handle to turn said torque bolt, secured in the handle position by a kotter key on one end of said bolt. For use as a valve and valve seat grinding tool, remove said kotter key and secure said kotter key end into the chuck of a speed drill. Then place rubber disc on one side of the valve top. Occasionally, change said disc from one side to the other side of said valve top, thus rotating the valve in each direction. This is considered the proper way to grind the valve and valve seat.

It is the simple object of my invention to provide a simple, rugged, low-cost tool mainly for the "do-it-yourself" repairman.

It is another object of my invention to make the combination tool easy to locate and purchase. The low cost and unique appearance should encourage small parts and supply stores to stock said tool.

Said tool could also be advertised in magazines and sold by mail including a booklet on trouble shooting and minor lawnmower engine repairs.

One repair job should off-set the cost of said tool by saving time, money and energy, plus a self-rewarding feeling. Likewise, a lawn-mower operator that understands his lawnmower becomes a safer lawnmower operator.

It is still a further object of my invention to provide a tool that is easy to store or hang on the wall instead of storing four separate special tools. The professional repairman would also find said tool handy for use when called to make repairs away from the shop.

It is obvious to one skilled in the art that minor changes could be made on the wrench and flywheel puller to fit other makes of engines or if Briggs and Stratton decided to change the design of their starter clutch housing or the flywheel.

The information I have at this time indicates that my combination tool fits about 90% of the past and new lawnmower engines.

It is yet another object of my invention to simplify lawnmower engine repairs so that only one special tool is required along with the usual standard tools.

To completely overhaul and rebuild a worn out engine requires other special tools, but in most cases such lawnmowers are discarded. Said object is to be able to make minor repairs so that a lawnmower does not have to be discarded before it is worn out.

These and other objects and advantages of my invention will become apparent from the detailed descriptions herein below—read in conjunction with the several drawings.

DETAILED DESCRIPTION OF THE PREFERRED EMBODIMENT

Figure 1:
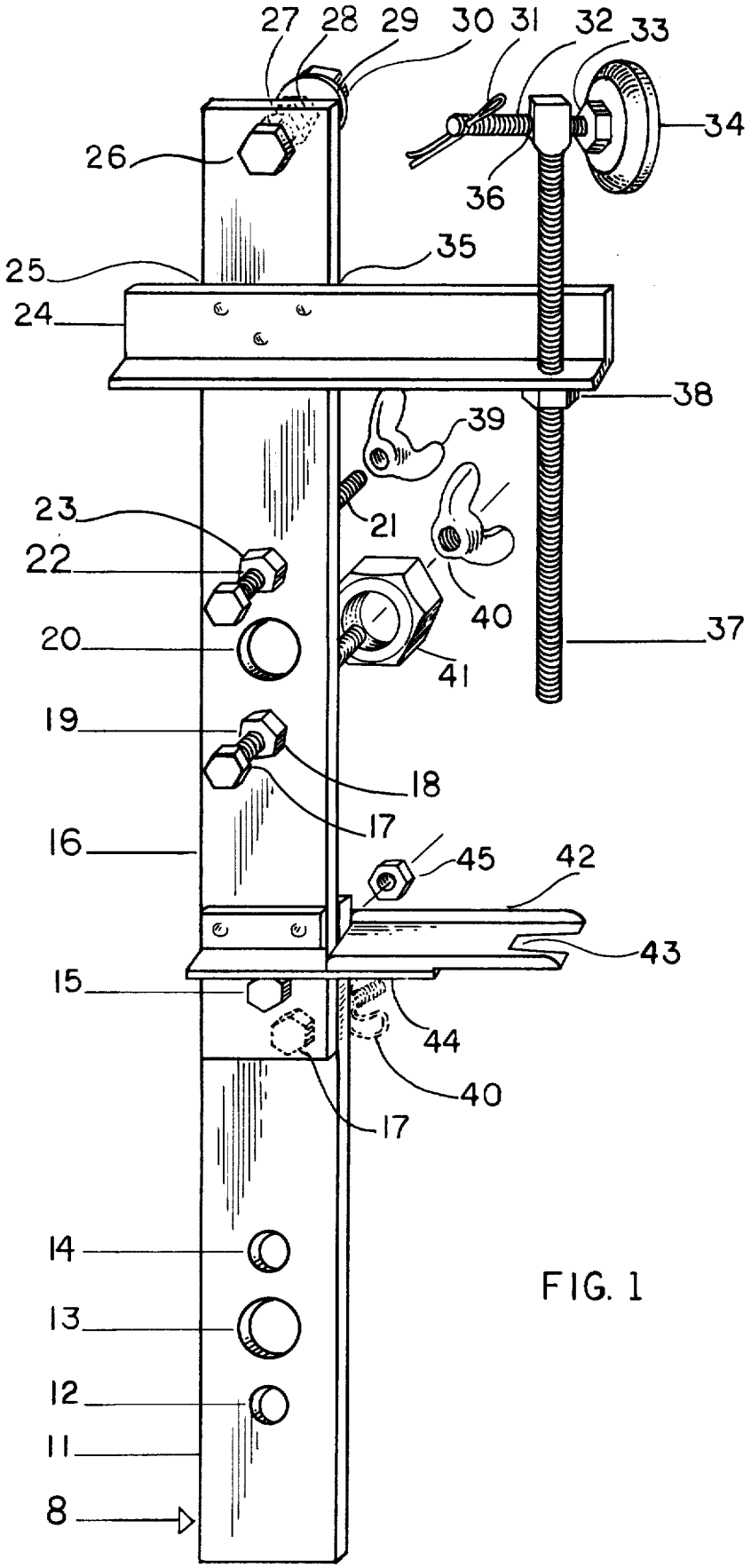
FIG. 1 is a top view of my combination tool showing the extension handle in leverage position.

FIG. 1 shows a top view of the preferred embodiment of the combination tool 8. Said tool 8 consists of five sections of various lengths and shapes of metal for the construction in order to define a "C" shaped three-sided frame. A detailed description of said five sections is described in the following specifications.

Said tool 8 also consists of six threaded bolts, eight threaded nuts two threaded wing nuts, a round rubber disc and one kotter key. Likewise described later.

Section 16 is 9" long and 1¼" wide and 3/16" thick and is formed from a rectangular bar of steel stock.

Extension handle 11 is 6" long and formed from the same type of steel stock.

Bolt 15 secured by nut 45 acts as a pivot bolt for said section 11 which may be used in one of two positions.

Figures 2, 3:
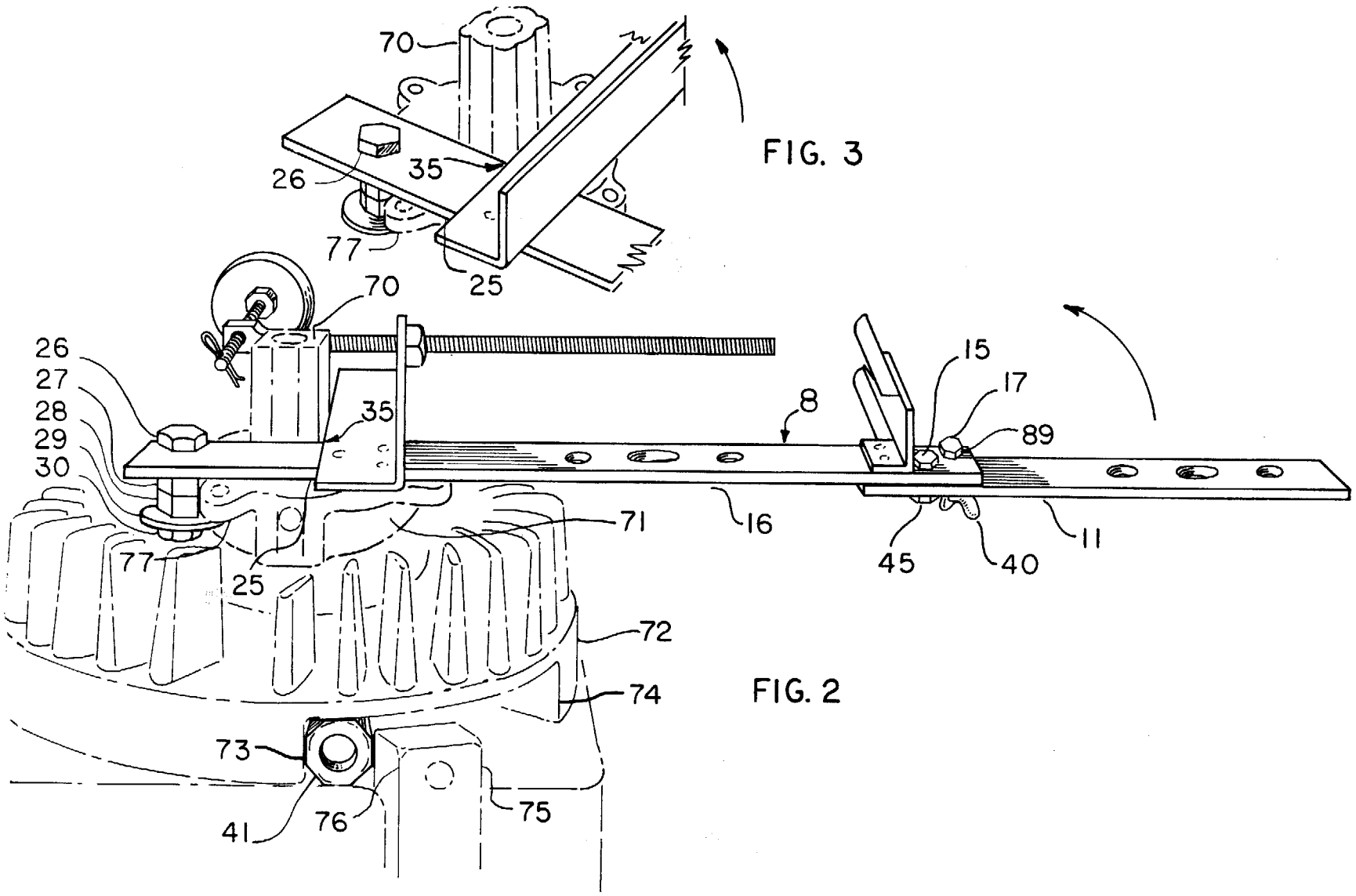
FIG. 2 is a side view of my combination tool placed on top of a starter clutch housing for use as a wrench.
FIG. 3 is an enlarged sectional view of FIG. 2.

Said section 11 for one of two uses may be used for an extension handle (FIGS. 1 and 2), thus pivoted end to end onto section 16 (FIGS. 1 and 2). Thus providing leverage for wrench use.

Self-threading bolt 17 and wing nut 40 are also temporarily positioned and tightened through hole 89 (FIG. 2) for securing said handle 11.

Figures 4, 5:
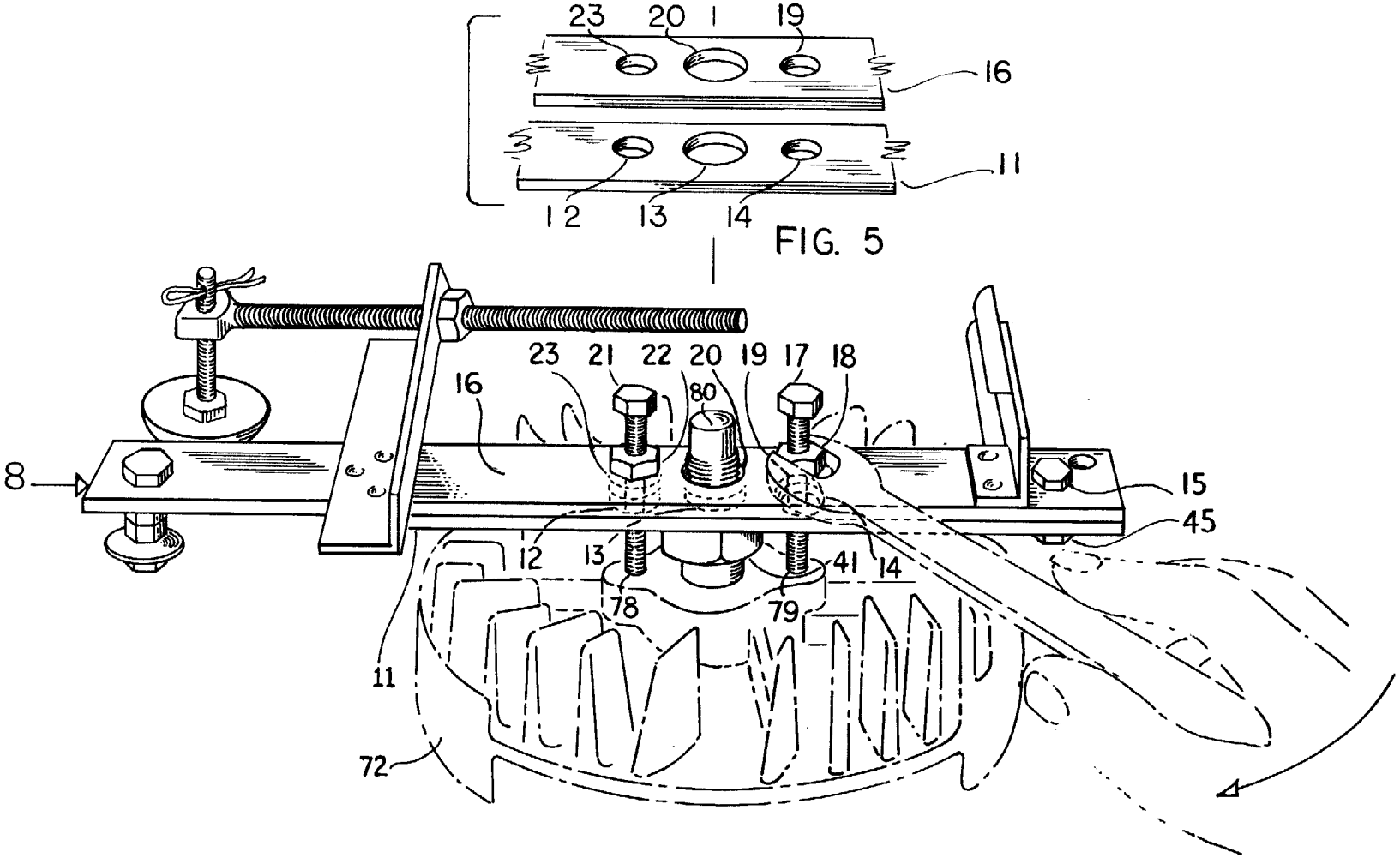
FIG. 4 is a side view of my combination tool in position for use as a fly wheel puller.
FIG. 5 is an enlarged sectional view of FIG. 4 showing the aligned and matching holes.

Section 11 may also be pivoted a half round thereby being parallel with and disposed in one position flat against Section 16 (FIG. 4), thus forming a double thickness of steel for flywheel pulling (FIG. 4).

A ⅝" nut 41 for one of two uses serves to block the flywheel 72 (FIG. 2) in a stationary position while unthreading or tightening the starter clutch housing 71 (FIG. 2) for unthreading said housing 71 (FIG. 2) place ⅝" nut 41 between the flywheel offset 73 (FIG. 2) and the engine block offset 76 (FIG. 2).

For tightening said housing 71 (FIG. 2) place ⅝" nut 41 on the opposite side between the flywheel offset 74 (FIG. 2) and the engine block offset 75 (FIG. 2).

Bolt 26 is 1¼" long projecting from one side of section 16 near the upper end of section 16.

Said bolt 26 serves as a post and is secured in said post position by three nuts 27, 28 and 30.

Washer 29 serves as a concentric circular head to fit under the starter clutch housing offset 77 (FIG. 2), thus to prevent said tool 8 from being disengaged while said tool 8 is in use as a wrench while applying torque against said housing 71 (FIG. 2).

Angle iron 24 is a 4" section of angle iron secured across said section 16 forming right angles 25 and 35 on each side of said section 16 a predetermined distance below said post 26.

Thus said angle formations 25 and 35 in cooperation with said post 26 form a wrench-like coupling when placed onto the top of a starter clutch housing 71 (FIG. 2) for removing or tightening said starter clutch housing 71 (FIG. 2).

Section 11 and section 16 each include three aligned holes through each section.

Holes 12, 13 and 14 through section 11 line up with and match holes 19, 20 and 23 in section 16 when section 11 is pivoted flat against and parallel with section 16 for flywheel pulling (FIG. 4), thus forming combined holes and a double thickness of steel. Thus said combined outside holes 19 and 23 (FIG. 4) each contain a self-threading bolt 17 and 21 (FIGS. 1 and 4).

Said bolts 17 and 21 each carries a force applying threaded nut 18 and 22 (FIGS. 1 and 4) and a wing nut 39 and 40 (FIG. 1).

Said wing nuts 30 and 40 serve to temporarily secure each bolt in its respective hole (FIG. 1).

Bolt 17 additionally temporarily carries a ⅝" nut 41 (FIG. 1) which may be removed and for one of two uses may be secured to the top of the crankshaft 80 (FIG. 4) to provide a base for said middle hole 20 for said tool 8 (FIG. 4) to rest on, when using said tool 8 to remove a flywheel 72 (FIG. 4).

Said middle hole 20 when in position on top of ⅝" nut 41 (FIG. 4) allows the two outside holes 19 and 23 (FIG. 4) to line up with factory provided holes 78 and 79 (FIG. 4) in the flywheel 72 (FIG. 4).

Therefore, said self threading bolts 17 and 21 are threaded into said factory holes 78 and 79, and said force applying nuts 18 and 22 are threaded clockwise against said parallel sections 11 and 16 (FIG. 4) to elevate the flywheel for removal (FIG. 4).

For removal of the valve a short section of angle iron 44 is secured at the lower end of section 16 horizontally to one side thereof (FIG. 1). The upper side of said short angle iron 44 supports a short section of channel iron 42.

A cut-out jaw 43 on one end of said channel iron 42 designed to straddle a valve stem 82 (FIG. 6) likewise to fit under the valve spring 83 (FIG. 6), the outer end of said first angle iron section 24 having a threaded nut 38 secured thereto for valve removing.

Figure 6:
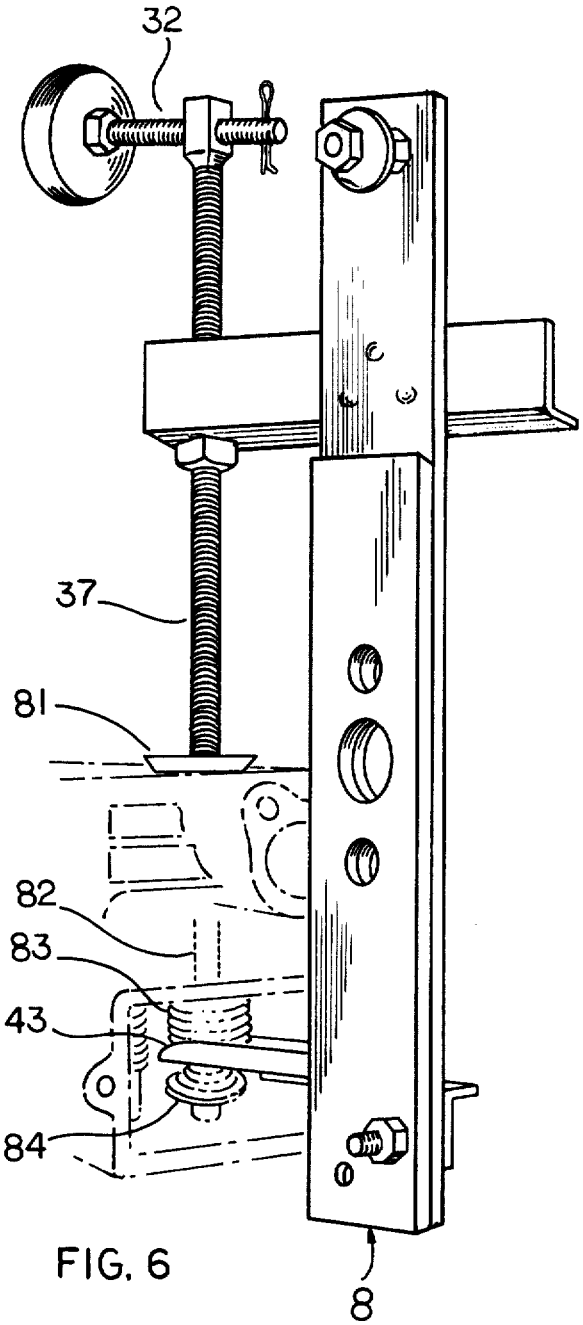
FIG. 6 is a perspective view of the combination tool in position for removing or replacing a valve.

Also a threaded bolt 37 is mounted in said nut 38 for applying torque. Therefore when said channel iron 43 is shoved under the valve spring 83 (FIG. 6) and said threaded torque bolt 37 is fitted against the top of the valve 81 (FIG. 6) said threaded torque bolt 37 (FIG. 6) may be threaded in a clockwise direction to elevate a valve spring 83 (FIG. 6) upwards for removal of the valve retainer 84 and valve 81 (FIG. 6).

Figure 7:
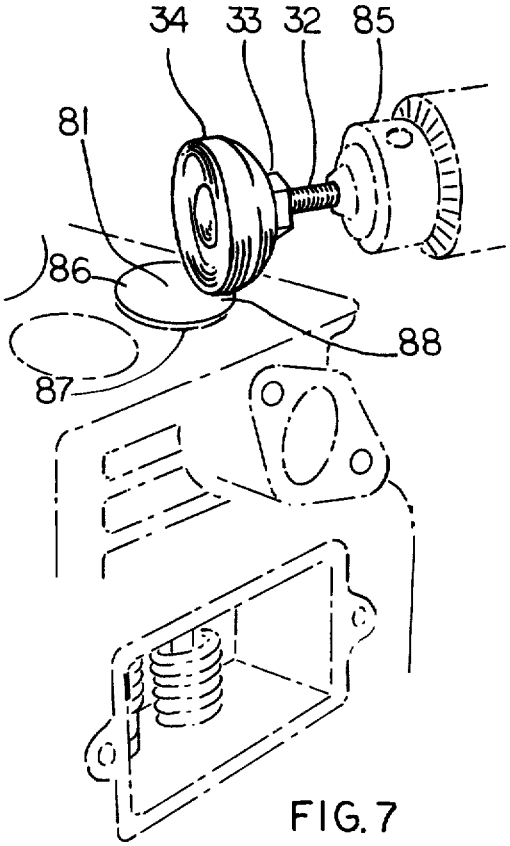
FIG. 7 is a perspective view of the valve grinding tool separated from the combination tool of FIG. 1 shown grinding a valve and valve seat in use with an electric drill.

Threaded bolt 32 positioned through hole 36 at the upper end of threaded torque bolt 37 serves two uses. One use is to serve as a handle 32 for turning said torque bolt 37 (FIG. 6). For a second use said bolt 32 is removed from said tool 8 for use as a valve and valve seat grinding tool for use with an electric drill (FIG. 7). Said bolt 32 on one end provides a round rubber disc 34 secured thereto by a threaded nut 33. The opposite end of said bolt 32 provides a kotter key 31 (FIG. 1) to secure said bolt 32 in position for use as a handle.

For use as a valve and valve seat grinding tool (FIG. 7) remove said kotter key 31 (FIG. 1) and position kotter key end of said bolt 32 into the chuck of an electric drill 85 (FIG. 7).

Thus spinning the electric drill 85 (FIG. 7) likewise spins said bolt 32 and said disc 34. Therefore by placing said rubber disc 34 to the outside edge 88 (FIG. 7) of the top of the valve 81 (FIG. 7) said disc 34 creates friction against said valve 81 (FIG. 7) thus spins said valve 81 (FIG. 7) in clockwise direction.

For spinning said valve 81 counter-clockwise, move said disc 34 to the opposite side of valve 81, and thus contact against the edge 86 of said valve 81 spins said valve 81 counter-clockwise.

Spinning the valve 81 (FIG. 7) in both directions is recommended for best results when grinding the valve 81 (FIG. 7) and valve seat 87 (FIG. 7) with a grinding compound placed between said valve 81 and said valve seat 87 (FIG. 7).

I claim:

1. A combination tool designed for use as a wrench, flywheel puller, valve remover and valve grinder for use on small gasoline combustion engines comprising:

a long rectangular bar of steel stock having a post like projection at one end projecting from one side thereof; a predetermined distance from said post, a short section of angle iron is welded across said long bar forming right angles on each side thereof;

said post in cooperation with said right angle formations provides a wrench-like coupling with a starter clutch housing when placed on top thereof for removing or tightening the same: A second rectangular bar, being parallel with and disposed in one position flat against said first rectangular bar; said bars being secured together on one end by a pivot bolt and nut; said second bar being pivoted end to end of said long bar to a second position and secured in said position by a self-threading bolt and wing-nut to provide an extension handle when said tool is used for wrench use;

said bars in said first parallel position provide a double strength for flywheel pulling and further include three aligned holes through each of said parallel bars;

the two outside holes each contain a self-threading bolt which carries a force applying threaded nut and a threaded wing nut for temporarily securing each bolt in its respective hole;

one bolt additionally temporarily carries a ⅝" nut which may be removed and screwed onto the top of the crankshaft to provide a base at said middle hole for said bars to rest on when using the tool to remove a flywheel; said middle hole when in position on top of the ⅝" nut allows the outside holes to line up with factory provided holes in the flywheel whereby said self-threading bolts may be threaded into said factory holes and said force applying nuts may be threaded clockwise against said parallel bars to elevate the flywheel for removal.

2. A combination tool according to claim 1, in which a second short section of angle iron is secured at the other end of said long rectangular bar forming a right angle therewith and extending horizontally to one side thereof; the upper side of said short angle iron section supports a short section of channel iron, a jaw cut out on one end of said channel iron to straddle a valve stem and fit under the valve spring;

said first section of angle iron at the first end of the rectangular bar, said second section of angle iron at said other end of said rectangulr bar and said rectangular bar together define a C-shaped three sided frame;

the outer end of said first angle iron section having a threaded nut secured thereto;

a threaded bolt mounted in said nut for applying torque whereby when said channel iron is shoved under a valve spring and said threaded torque bolt is fitted against the engine block, said threaded torque bolt may be threaded in a clockwise direction to elevate a valve spring upwinds for removal of the valve retainer and valve.

3. A combination tool according to claim 2, in which the upper end of said torque bolt comprises a hole; a smaller threaded bolt is mounted in said hole for use as a handle to turn said threaded torque bolt;

said smaller threaded bolt having a round rubber disc at one end and a kotter key at the other end for removably mounting the same on said threaded torque bolt;

whereby said kotter key may be removed to place said smaller bolt into the chuck of an electric drill in order to place said rubber disc against either side of the top of a valve to turn said valve for lapping with a valve grinding compound.

*4. A combination tool comprising:*

*an elongated first rectangular bar;*

*a post-like projection projecting from one side thereof;*

*a short member rigidly coupled to said bar at right angles thereto and at a predetermined position from said post,*

*said post, in cooperation with said short member, providing a wrench-like coupling with a starter clutch housing on a small gasoline combustion engine when placed on top thereof for removing or tightening the same;*

*a second rectangular bar;*

*means for pivotally coupling the ends of said first and second rectangular bars for movement between a first position in which said bars are parallel and in contact and a second position in which said bars are parallel and end to end;*

*means for securing said first and second bars in said second position to provide an extension handle when said tool is used for wrench use;*

*three holes in each of said first and second bars which respectively align in pairs when said bars are in said first position;*

*a pair of threaded bolts, each carrying a force applying threaded nut and means for temporarily securing each bolt respectively in two outside holes; and*

*a large nut, temporarily carried by one of said bolts, which nut may be removed and screwed onto the top of the crankshaft of a small gasoline combustion engine to provide a base at the middle holes of said bars for said bars to rest on when using the tool to remove a flywheel,*

*said middle holes when in position on top of said large nut allowing the outside holes to line up with factory provided threaded holes in the flywheel whereby said threaded bolts may be threaded into said factory holes and said force applying nuts may be threaded clock-*

*wise against said parallel bars in said first position to elevate the flywheel for removal.*

*5. A combination tool according to claim 4, and further comprising*

*a second short member secured at the other end of said first rectangular bar and at right angles thereto;*

*a jaw shaped cut out formed in said second short member for straddling a valve stem and fitting under the valve spring of a small gasoline combustion engine;*

*said first short member, said second short member and said first rectangular bar defining a C-shaped three sided frame,*

*said first short member having a threaded nut rigidly secured thereto;*

*a threaded bolt mounted in said nut for applying torque whereby when said second short member is shoved under a valve spring and said threaded torque bolt is fitted against the block of the engine, said threaded torque bolt may be threaded in a clockwise direction to elevate the valve spring upwards for removal of the valve retainer and valve.*

*6. A combination tool according to claim 5 wherein* the upper end of said threaded torque bolt includes a hole,

*a smaller threaded bolt is mounted in said hole for use as a handle to turn said threaded torque bolt,*

*said smaller threaded bolt having a round rubber disc at one end and a kotter key at the other end for removably mounting said smaller threaded bolt on said threaded torque bolt;*

*whereby said kotter key may be removed to place said smaller threaded bolt into the chuck of an electric drill in order to place said rubber disc against either side of the top of a valve to turn said valve for lapping with a valve grinding compound.*

*7. A combination tool comprising:*

*an elongated first bar;*

*a post-like projection projecting from one side thereof;*

*a short member rigidly coupled to said bar at right angles thereto and at a predetermined position from said post,*

*said post, in cooperation with said short member, providing a wrench-like coupling with a starter clutch housing on a small gasoline combustion engine when placed on top thereof for removing or tightening the same;*

*three holes in said first bar,*

*a pair of threaded bolts, each carrying a force applying threaded nut and means for temporarily securing each bolt respectively in two outside holes; and*

*a large nut, temporarily carried by one of said bolts, which nut may be removed and screwed onto the top of the crankshaft of a small gasoline combustion engine to provide a base at the middle hole of said bar for said bar to rest on when using the tool to remove a flywheel,*

*said middle hole when in position on top of said large nut allowing the outside holes to line up with factory provided threaded holes in the flywheel whereby said threaded bolts may be threaded into said factory holes and said force applying nuts may be threaded clockwise against said bar to elevate the flywheel for removal.*

*8. A combination tool according to claim 7, and further comprising*

*a second short member secured at the other end of said first bar and at right angles thereto;*

*a jaw shaped cut out formed in said second short member for straddling a valve stem and fitting under the valve spring of a small gasoline combustion engine;*

*said first short member, said second short member and said first bar defining a C-shaped three sided frame,*

*said first short member having a threaded nut rigidly secured thereto;*

*a threaded bolt mounted in said nut for applying torque whereby when said second short member is shoved under a valve spring and said threaded torque bolt is fitted against the block of the engine, said threaded torque bolt may be threaded in a clockwise direction to elevate the valve spring upwards for removal of the valve retainer and valve.*

* * * * *